United States Patent
Schlegel

[11] Patent Number: 5,901,331
[45] Date of Patent: May 4, 1999

[54] METHOD FOR CONTINUOUS DATA SAFEGUARDING ON A MAGNETIC TAPE AND DATA RESTORING THEREFROM

[75] Inventor: Peter Schlegel, Irschenberg, Germany

[73] Assignee: SEP Elektronik GmbH, Weyarn, Germany

[21] Appl. No.: 08/845,266

[22] Filed: Apr. 24, 1997

Related U.S. Application Data

[63] Continuation of application No. 08/381,550, Jan. 31, 1995, abandoned.

[51] Int. Cl.$^6$ .............................. G06F 12/00; G06F 13/00
[52] U.S. Cl. .......................... 395/842; 395/847; 395/851; 395/880; 395/308; 395/309
[58] Field of Search ..................................... 395/309, 835, 395/837, 840, 841, 851, 853, 856, 858, 872, 881, 438, 439, 441, 200.41–200.49, 200.61–200.65, 200.72, 855, 880; 711/161–162

[56] References Cited

U.S. PATENT DOCUMENTS

| | | | |
|---|---|---|---|
| 4,344,132 | 8/1982 | Dixon et al. | 395/821 |
| 4,493,028 | 1/1985 | Heath | 395/200.62 |
| 4,620,279 | 10/1986 | Read et al. | 395/854 |
| 4,814,977 | 3/1989 | Buonomo et al. | 395/200.62 |
| 5,133,065 | 7/1992 | Cheffetz et al. | 395/575 |
| 5,212,722 | 5/1993 | Masters | 395/200.01 |
| 5,212,772 | 5/1993 | Masters . | |
| 5,247,670 | 9/1993 | Matsunaga . | |
| 5,276,867 | 1/1994 | Kenley et al. | 395/600 |
| 5,504,873 | 4/1996 | Martin et al. | 395/438 |
| 5,535,381 | 7/1996 | Kopper | 395/600 |
| 5,577,213 | 11/1996 | Avery et al. | 395/280 |

FOREIGN PATENT DOCUMENTS 359471   3/1990   European Pat. Off. .

*Primary Examiner*—Ayaz R. Sheikh
*Assistant Examiner*—Raymond N Phan
*Attorney, Agent, or Firm*—Emrich & Dithmar

[57] ABSTRACT

A method for data backup on magnetic tape including data restoring provides a sequence of functions such that for data backup the data which are stored in data files and memories are collected and transferred through a network interconnection to a data backup system and from there to a magnetic tape, wherein the data stream is continuously effected so that the data to be safeguarded do not undergo a temporary storage. The speed and reliability of data safeguarding is thus greatly increased. The sequence of functions for data restoring is the reverse of those for data backup.

4 Claims, 1 Drawing Sheet ved to the magnetic tape without being subjected to
METHOD FOR CONTINUOUS DATA SAFEGUARDING ON A MAGNETIC TAPE AND DATA RESTORING THEREFROM This is a continuation of application Ser. No. 08/381,550, filed Jan. 31, 1995, now abandoned.

BACKGROUND OF THE INVENTION

1. Field of the Invention

The present invention relates to a method for data safeguarding and/or data restoring by using a magnetic tape, including the steps of reading the data to be safeguarded from at least a data file or a memory, collecting the data as a data save set in a device for packing up the data, setting up a network interconnection to a data safeguarding system, using a magnetic tape, transmitting the data save set via the network interconnection and recording the data save set on magnetic tape.

2. Description of the Prior Art

Provisions for safeguarding data are known. Rather often, a data processing system includes a plurality of satellite computers and respective data files communicating with each other via a network interconnection. The data stored in the data files are safeguarded by connecting a data backup system to the network and recording the data to be safeguarded on a magnetic tape. According to prior art, this can be effected such that to each satellite processor of the overall system a device for data pack-up is associated which, upon request by a suitable command, reads and collects the data to be safeguarded from the data files and/or memories by using respective memorized commands. In collecting, the data to be read are set up to a so-called save set. As soon as a data save set of this type is ready, it will be temporarily stored. Subsequently, the transfer channel is set up via an interface of the satellite processor to the network and from the network via a further interface to the data safeguarding system. Thereafter, the data save set will be transmitted from the temporary memory of the data pack-up device through the transfer channel to a fixed magnetic disk in the data safeguarding system and then the data will be fed from the fixed magnetic disk to the magnetic tape. For data restoring the data transfer is effected vice versa.

Temporarily storing the data several times, such as at the source or satellite processor and further before transmiting to the magnetic tape requires time. Moreover, by manipulating the data this way, the reliability of the data backup becomes worse.

SUMMARY OF THE INVENTION

It is an object of the invention to provide a method for data safeguarding and/or data restoring, aiming at accelerating the transmission of data to be safeguarded to the magnetic tape and increasing the reliability.

According to the invention, the transmission channel to the data safeguarding system and to the magnetic tape is set up right after starting the data collecting in the data packup device of the respective satellite computer, and the transmission of the data to be safeguarded is initiated, without waiting until the data save set is completed. Furthermore, any temporary storing is eliminated. The transfer of the data stream is continuously effected. This is equally true for the data safeguarding system, where the temporary storage, for example by means of a fixed magnetic disk is eliminated. Rather, the transmission channel to the magnetic tape will be directly established so that the data stream is continuously transmitted to the magnetic tape without being subjected to a temporary storage.

According to the invention, the time for data safeguarding is reduced and the reliability is increased as temporary memories are eliminated. The data stream to be safeguarded is thus not manipulated.

Data return of the data save sets from the magnetic tape back to the respective data file is effected vice versa.

After searching and locating the data save set on the magnetic tape, the transmission channel to the respective data file is established via the network and then the transmission of the continuous data stream is directly effected to the device for data pack-up which now performs the function of distributing the data to the data files.

In particular there is a coordination between the data pack-up device or, respectively the data distributing device and the data transmission. Accordingly, there is connected a so-called pipeline for controlling the data stream between the data pack-up device and the interface for connecting the satellite computer to the network. As long as the data transmission channel has not yet been set up, or when the data transmission must be interrupted as the network is required for other tasks, the pipeline interrupts the data stream as well as any further collecting and packing-up of data. As long as no data can be transmitted to the network via the interface as a transmitter, the operation of the data pack-up device will be interrupted. In this case the magnetic tape drive of the data safeguarding system will be automatically stopped. This does not cause any problems since modern magnetic tape drives are known to be intelligent, i.e. having the ability to wait when the data buffer register is empty, while starting to operate when the data buffer register is full. This function is quite a standard feature for all types of magnetic tape drives referred to. As soon as data are again output from the pipeline for transmission, the pack-up device will be again activated and the transmission of the data stream is continued. Thereafter, the magnetic tape drive is again started to operate since new data to be memorized are presented. The magnetic tape drive behaves correspondingly when an interruption occurs during data restoring.

BRIEF DESCRIPTION OF THE DRAWINGS

An embodiment of the present invention will be described as follows with reference to the drawings.

DESCRIPTION OF THE PREFERRED EMBODIMENTS

Figure 1:
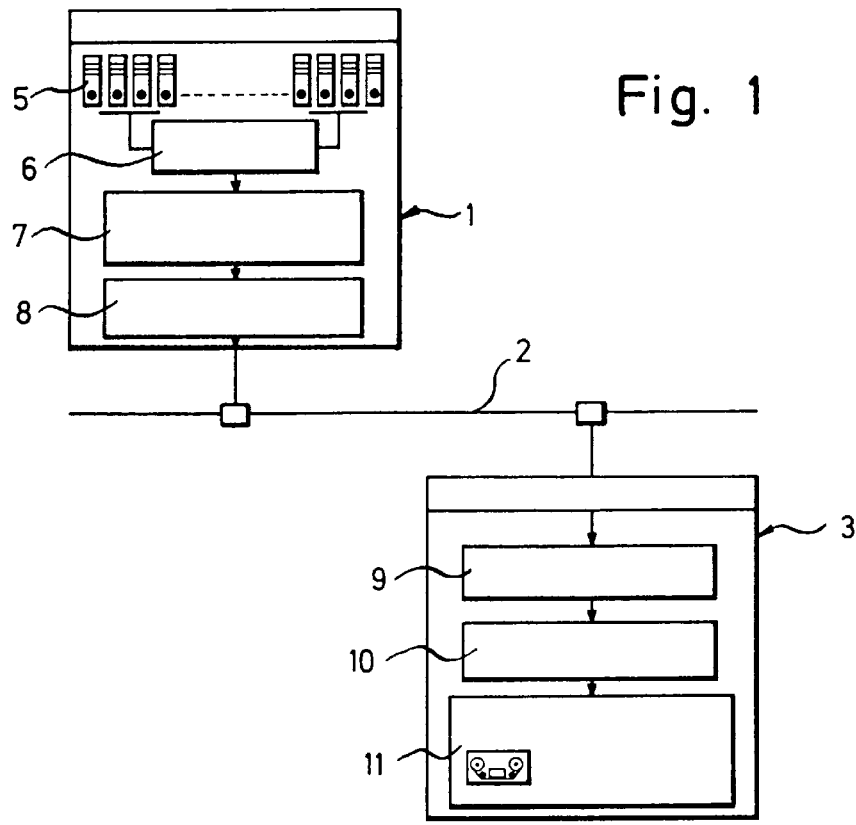
FIG. 1 shows a schematic diagram of the sequence of functions for data safeguarding.

A plurality of satellite or client computers of which FIG. 1 shows just a computer 1, is connected to a network interconnection 2. A data safeguarding system 3 being connected to the network interconnection 2 is commonly provided for all satellite computers 1.

It should be assumed that each satellite computer 1 includes a plurality of data files 5 which data should be safeguarded. Each satellite computer 1 includes a device 6 for packing-up and collecting the data, which device 6 is connected to the network 2 through an interface 8. Between the data pack-up device 6 and the interface 8 there is a transmitting means 7, i.e. a pipeline 7 including a time control for routing the data save set from the device 6 to the interface 8 from which the data will be transmitted to the network.

The data safeguarding system 3 is connected to the network 2 through an interface 9. The backup data will be recorded on a magnetic tape 11. Between the interface 9 and the magnetic tape 11 there is a device 10 for controlling the data stream. The device 10 initiates the magnetic tape drive to be ready for recording, further receives the data stream from the network interface 9 and channels the data stream to the magnetic tape 11.

The operation is as follows: For data backup the device 6 in the respective satellite computer 1 is required to collect the data to be safeguarded from the data files 5 which data are packed-up to a package, i.e. the data save set which is output by the device 6. The device 7 (pipeline) effects the controlled transmission of the input data to the network interface 8. The input data will be routed to the output as long as they will be transmitted there. In case this is not possible, the data stream is stopped at the input and any further collecting and data packing up is stopped. As soon as the output of the network interface is not busy anymore, routing the data stream is reinitiated. As soon as a data safeguarding operation shall be started, the transmission channel is established from the respective satellite computer via the network interconnection 2 to the data safeguarding system 3 and subsequently the transmission is immediately effected by establishing a continuous data stream.

The magnetic tape 11 receives the data stream via the interface 9 in the data safeguarding system 3 for transmission to the device 10 for converting the data save set.

Figure 2:
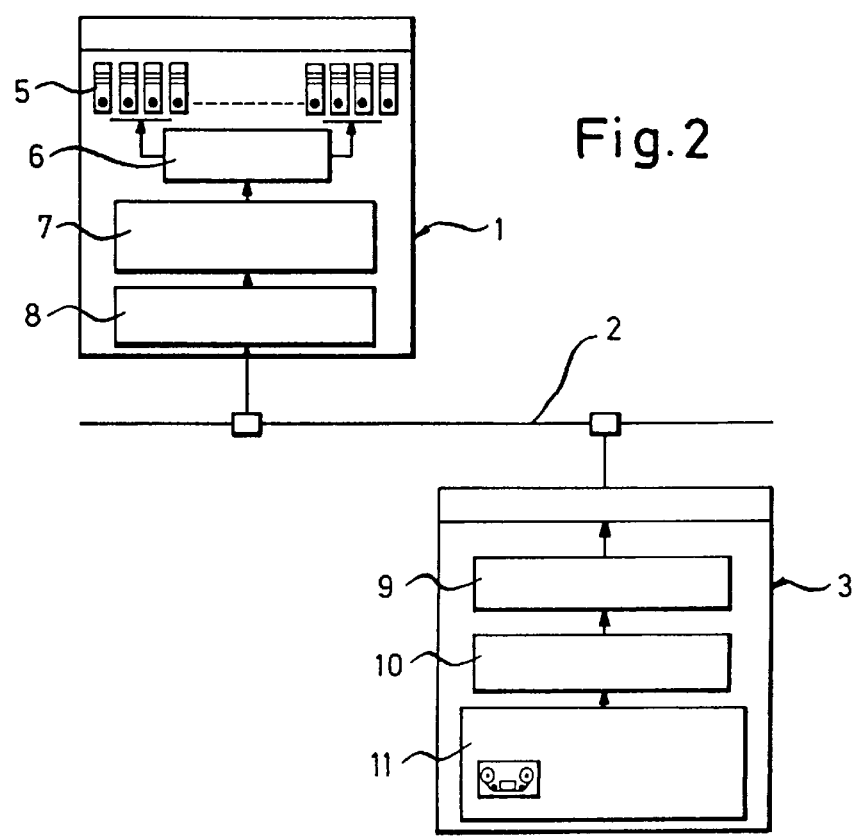
FIG. 2 show a schematic diagram of the sequence of functions for data restoring.

The reverse sequence of functions for data restoring is shown in FIG. 2. The devices show identical reference numerals as in FIG. 1. As soon as a data restoring is to be effected, the respective data save set which has to be transmitted to the respective satellite computer is looked up on the magnetic tape 11 and will be directly transmitted from the tape via the device 10 to the interface 9. The transmission channel will be established by the respective satellite computer 1 as soon as the magnetic tape 11 is ready for being read out. Subsequently the data stream will be transmitted via the interface 9 to the satellite computer 1 and via the pipeline 7 to the device 6 which is now effective to distribute the data to the respective data files 1. The device 7 is thus operable in both directions. For data restoring the input data from the interface 8 are routed to the output, i.e. to the distributing device 6 as long as they are picked up therefrom.

I claim:

1. A method for data restoring, including the steps of:

searching and reading the data stored as a data save set on a magnetic tape in a data safeguarding system, setting up a network interconnection between the data safeguarding system and a node apparatus including at least a data file or a memory and a data distributing device, and transmitting the data via the network interconnection to the data distributing device for reading the data into the data file or memory without waiting for completion of the reading of the data save set from the magnetic tape, wherein in starting reading out the data from the magnetic tape, the network interconnection between the data safeguarding system and the data distributing device will be set up and reading out of data from the magnetic tape continues only while the network interconnection between the data safeguarding system and the data distributing device is set up, and wherein a data save set is transmitted in a continuous data stream via a controller for rerouting the data to the network interconnection without a temporary storage or processing and the data stream is directly transmitted through the data distributing device into the data file or memory.

2. The method of claim 1, including the further step of connecting a computer, including a memory for storing the data to be safeguarded, through an interface to the network interconnection, and connecting the data safeguarding system through an interface to the network interconnection, wherein the continuous data stream is transmitted to the data distributing device from the interface in the computer via a pipeline, and further including the step of interrupting the distributing step of the data when no data are transmitted thereto from the pipeline.

3. A method for safeguarding data from at least a data file or memory at a node of a network by using a magnetic tape, the method comprising the steps of:

reading the data to be safeguarded from a plurality of data files or memories, collecting the data as a data save set in a data pack-up device, setting up a network interconnection between the node and a data safeguarding system including the magnetic tape without waiting for the collecting of the data save set to be completed, routing the data of the data save set from the data pack-up device to the network interconnection through a pipeline having an output and including a time control for interrupting the collecting of data in the data pack-up device as long as no data can be transmitted from the output to the network interconnection, the data routing continuing as long as the data is transmitted via the network interconnection, transmitting the data of the data save set through the network interconnection, and recording the data of the data save set on the magnetic tape, wherein the data collecting continues only while the network interconnection between the data pack-up device and the data safeguarding system is set up and while said pipeline is routing the data of the data save set, and wherein the data of the data save set is received in a continuous data stream via a controller for rerouting the data of the data save set to the magnetic tape without being temporarily stored or processed and the continuous data stream is directly recorded on the magnetic tape.

4. The method of claim 3, including the further step of connecting a computer, including a memory for storing the data to be safeguarded, through an interface to the network interconnection, and connecting the data safeguarding system through an interface to the network interconnection, wherein the continuous data stream is transmitted from the data collecting device to the interface in the computer via a pipeline, and further including the step of interrupting the collecting step when no data are transmitted from the output of the pipeline.

* * * * *